A. JABUSCH.
AUTOMOBILE TIRE PUMP.
APPLICATION FILED JAN. 17, 1913.

1,069,015.

Patented July 29, 1913.
2 SHEETS—SHEET 1.

Witnesses

Inventor
Alfred Jabusch

By Victor J. Evans
Attorney

A. JABUSCH.
AUTOMOBILE TIRE PUMP.
APPLICATION FILED JAN. 17, 1913.

1,069,015.

Patented July 29, 1913.

2 SHEETS—SHEET 2.

Witnesses

Inventor
Alfred Jabusch
By Victor J. Evans
Attorney

UNITED STATES PATENT OFFICE.

ALFRED JABUSCH, OF DEER PARK, WISCONSIN.

AUTOMOBILE TIRE-PUMP.

1,069,015.  Specification of Letters Patent.  Patented July 29, 1913.

Application filed January 17, 1913. Serial No. 742,657.

*To all whom it may concern:*

Be it known that I, ALFRED JABUSCH, a citizen of the United States, residing at Deer Park, in the county of St. Croix and State of Wisconsin, have invented new and useful Improvements in Automobile Tire-Pumps, of which the following is a specification.

The present invention is primarily designed to supply a mechanism which may be fitted to automobiles or other mechanically propelled vehicles having pneumatic tires so that the engine or motor may be utilized as means for operating the compressor when it becomes necessary to inflate any one or more of the tires.

The invention consists of the novel features, details of construction and combination of parts, which hereinafter will be more particularly set forth, illustrated in the accompanying drawings, and pointed out in the appended claim.

Figure 1:
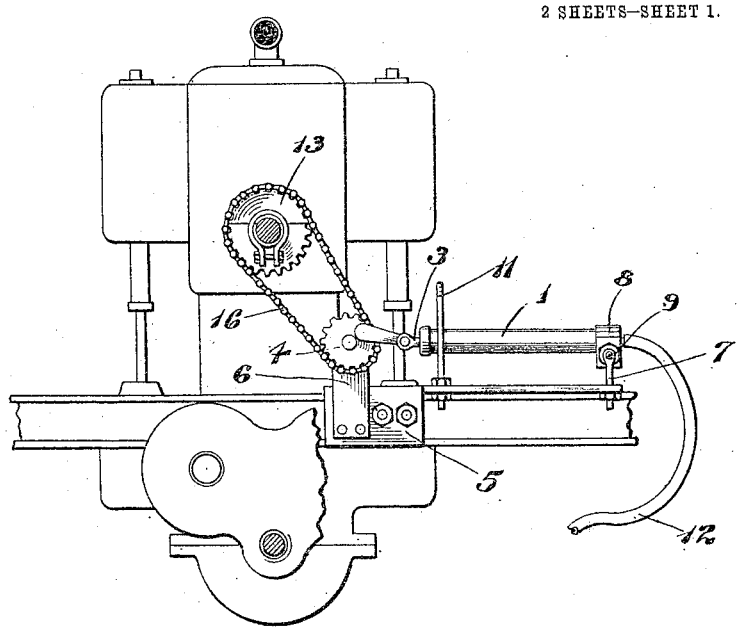
Figure 2:
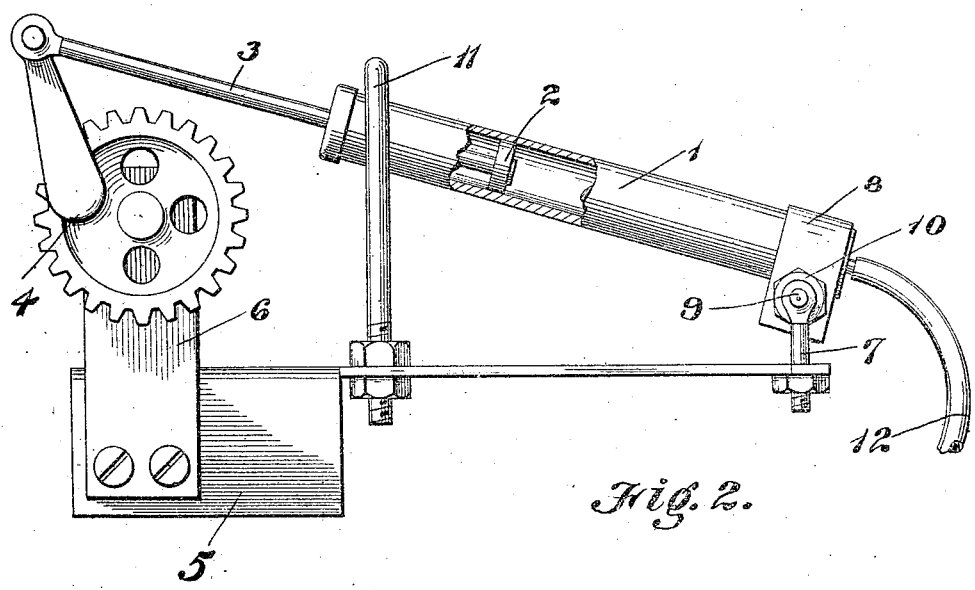
Figure 3:
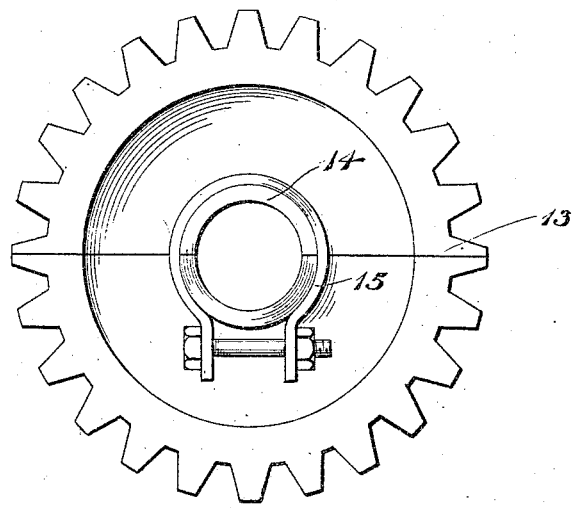
Figure 4:
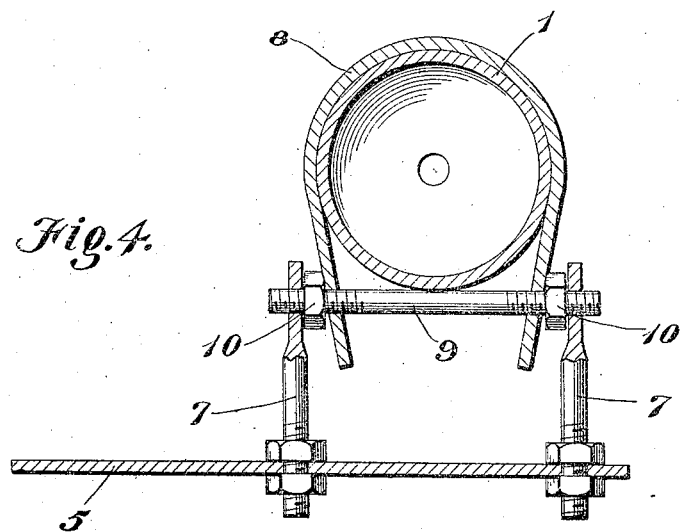

Referring to the drawings, forming a part of the specification, Figure 1 is a detail view, showing the application of the invention. Fig. 2 is a detail view of the compressor and its mountings. Fig. 3 is a detail view of the driver which is fitted to the shaft from which the compressor derives power. Fig. 4 is a sectional view, showing the connecting means between the barrel of the air compressor and the supporting plate.

Corresponding and like parts are referred to in the following description, and indicated in all the views of the drawings, by the same reference characters.

The compressor may be of any type and as shown consists of a pump embodying a cylinder 1 and a piston 2 arranged to operate within the cylinder and having its rod 3 connected with a crank wheel 4. A plate 5 supports the air compressor and crank wheel and is adapted to be secured in any manner to the frame of the machine. The plate 5 may be cast or cut from a metal plate of proper gage. A standard 6 rises from the plate 5 and supports the crank wheel 4. Standards 7 are fitted to the end portion of the plate 5 and pivotally support the cylinder or pump barrel 1, the latter having a metal strip 8 fitted to an end thereof and clamped by means of a bolt 9, which latter is supported in the standards 7. Nuts 10 are mounted upon end portions of the bolt 9 and serve to engage the ends of the metal strip 8 so as to draw the latter by a clamping action about the pump cylinder or barrel 1. The ends of the bolt 9 project beyond the nuts 10 to form journals which are mounted in openings at the upper ends of the standards 7. A guide 11 directs the pump barrel or cylinder 1 in its oscillatory movement, said guide being of substantially U form and connected to the plate 5 in any manner. A rubber tube 12 connects with the cylinder or barrel 1 and is adapted to be coupled to the valve of the tire to be inflated. The air compressor may be conveniently located upon the machine and is adapted to be driven by means of the engine or motor.

A driver 13 is secured to a shaft connected with the engine or motor so as to be driven therefrom. The driver 13 consists of a wheel or pulley which is split to enable the parts to be fitted about the shaft from which power is to be taken. A hub 14 projects from one side of the driver and is also split. A clamp 15 is fitted to the hub 14 and secures the driver upon the shaft. The clamp 15 consists of a strap which is shaped to embrace the hub 14 and has its end portions extended outwardly and pierced to receive a bolt by means of which the clamp is secured in place. The driver 13 preferably consists of a sprocket wheel and the crank wheel 4 is likewise of the sprocket type, the two being connected by means of a sprocket chain 16. The drawings illustrate the driver 13 secured to the fan shaft of a motor, but it is to be understood that it may be secured to any shaft or rotating part having connection with the motor. The compressor is located so that the two wheels 4 and 13 are in line, thereby enabling them to be connected by means of a sprocket chain 16.

When the air compressor is not required to be driven the rod 3 may be disconnected from the crank wheel 4 or the sprocket chain 16 may be removed, which operation may be easily accomplished by means of a split pin or separate link or in any other manner generally employed for separating a sprocket chain. When a tire is required to be inflated the clutch is thrown out of engagement and the air compressor coupled so as to be operated, the tube 12 being connected with the air valve of the tire in the manner well understood. The tube is to be of such a length as to reach all the tires of the machine. When the compressor is properly positioned upon the machine it remains in place and is adapted to be coupled to the motor at such times only as when it is required to inflate a tire.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

Tire inflating mechanism comprising a support, spaced standards rising from the support, an air compressor embodying a pump barrel, a strip embracing an end portion of the pump barrel and having its ends extended, a bolt passing through openings formed in the end extensions of the strip and mounted in the standards, nuts threaded upon end portions of the bolt inside the standards and clamping the strip about the pump barrel, guide means mounted upon the support and engaging the opposite end of the pump barrel, and operating means for the compressor.

In testimony whereof I affix my signature in presence of two witnesses.

ALFRED JABUSCH.

Witnesses:
  JNO. SAKRISON,
  R. H. SAKRISON.